(12) United States Patent
Bauer

(10) Patent No.: US 7,080,886 B2
(45) Date of Patent: Jul. 25, 2006

(54) HEADREST FOR A SEAT

(75) Inventor: Jürgen Bauer, Sulzbach (DE)

(73) Assignee: Recaro Aircraft Seating GmbH & Co. KG, Hall (DE)

( * ) Notice: Subject to any disclaimer, the term of this patent is extended or adjusted under 35 U.S.C. 154(b) by 0 days.

(21) Appl. No.: 10/509,995

(22) PCT Filed: Mar. 14, 2003

(86) PCT No.: PCT/EP03/02668

§ 371 (c)(1),
(2), (4) Date: Oct. 5, 2004

(87) PCT Pub. No.: WO03/084812

PCT Pub. Date: Oct. 16, 2003

(65) Prior Publication Data

US 2005/0116524 A1    Jun. 2, 2005

(30) Foreign Application Priority Data

Apr. 5, 2002 (DE) ................................ 102 15 058

(51) Int. Cl.
*A47C 7/36* (2006.01)
*A47C 7/72* (2006.01)

(52) U.S. Cl. ...................... 297/409; 297/397; 297/406; 297/407; 297/408; 297/410; 297/217.6

(58) Field of Classification Search ................ 297/410, 297/406, 407, 408, 409, 297, 217.6, 397
See application file for complete search history.

(56) References Cited

U.S. PATENT DOCUMENTS

| | | | | |
|---|---|---|---|---|
| 394,271 A | * | 12/1888 | Hooven | .................. 297/410 X |
| 2,638,152 A | * | 5/1953 | Pulsifer | .................. 297/410 X |
| 3,547,486 A | | 12/1970 | Herzer et al. | |
| 3,655,241 A | | 4/1972 | Herzer et al. | |
| 6,123,389 A | * | 9/2000 | O'Connor et al. | .......... 297/397 |
| 6,126,233 A | * | 10/2000 | Gaetano et al. | .......... 297/217.6 |
| 6,250,716 B1 | | 6/2001 | Clough | |
| 6,305,749 B1 | * | 10/2001 | O'Connor et al. | .......... 297/397 |
| 6,648,416 B1 | * | 11/2003 | O'Connor et al. | .......... 297/397 |
| 6,893,094 B1 | * | 5/2005 | O'Connor | .................... 297/397 |
| 6,893,096 B1 | * | 5/2005 | Bonn et al. | ................. 297/409 |
| 2003/0173812 A1 | * | 9/2003 | Ito | ............... 297/410 |

FOREIGN PATENT DOCUMENTS

WO    WO 95/09742    4/1995

* cited by examiner

*Primary Examiner*—Rodney B. White
(74) *Attorney, Agent, or Firm*—Roylance, Abrams, Berdo & Goodman, L.L.P.

(57) ABSTRACT

A headrest (1) for a seat (3), preferably a passenger seat, particularly an air passenger seat, includes at least one tilt adjusting device (27) and one height adjustment device (12) for adjusting the tilt or the height of the headrest (1) relative to the backrest (2) of the seat (3) on which the headrest (1) can be placed. A swiveling axis (28) for tilt adjustment of the headrest (1) is on guiding part (14), while pointing away from the headrest. The guiding part displaceably interacts with a longitudinal guide (13) and, together with this longitudinal guide, is part of the height adjusting device (12). The backrest structure can have a highly simplified design due to the longitudinal guide (13) being an integral part of the headrest (1) and the swiveling axis (28) of the guiding part (14) being fixed relative to the backrest (2), and since the frame of the backrest does not require any reinforcing structures or guide rails for accommodating a headrest. In addition, the possibilities for adjusting the height and tilt of the headrest relative to the backrest are greatly increased.

14 Claims, 3 Drawing Sheets

US 7,080,886 B2

HEADREST FOR A SEAT

FIELD OF THE INVENTION

The present invention relates to a headrest for a seat, preferably a passenger seat, in particular an aircraft passenger seat, having at least one tilt adjusting mechanism and one height adjusting mechanism for adjusting the tilt and/or the height of the headrest relative to the backrest of the seat on which the headrest may be mounted. A pivot shaft for the tilt adjustment of the headrest is mounted on an associated guide component facing away from the headrest. This guide component, which is displaceable, operates in conjunction with a longitudinal guide and together with this component forms the height adjustment component.

BACKGROUND OF THE INVENTION

A generic headrest of the state of the art is disclosed in WO 95/09742. The described headrest has a tilting adjusting mechanism and a height adjustment mechanism for adjustment of the tilt and height of the headrest relative to the backrest of a seat. The adjustment mechanisms for tilt and height are mounted on the rear side of the headrest facing away from the seat occupant and are partly integrated with the backrest of the seat. The longitudinal guides for the height adjustment mechanism are a component of the backrest and are rigidly connected to the frame structure of this backrest. The pivot shaft, about which the headrest moves as its tilt is adjusted, is positioned in the plane formed by the longitudinal guides and is correspondingly repositioned vertically when the height of the headrest is adjusted. The components of the tilt and height adjustment mechanism are mounted in the central area of the headrest, so that the potential tilt adjustment range, in particular, is reduced by the disclosed solution.

U.S. Pat. Nos. 3,655,241 and 3,547,486 disclose generic headrests for a passenger seat having at least one tilt adjustment mechanism and one height adjustment mechanism for adjustment of the tilt or the height of the headrest relative to the backrest of the seat on which the headrest may be mounted. A pivot shaft for the tilt adjustment of the headrest is mounted on an associated guide component facing away from the headrest, is a movably mounted and operates in conjunction with a longitudinal guide. Together with the longitudinal guide, the pivot shaft constitutes a component of the height adjustment mechanism The longitudinal guide is an integral component of the headrest, while the pivot shaft of the respective guide component is mounted stationary relative to the backrest.

In these conventional solutions, the pivot shaft as the tilt adjustment mechanism is guided along the upper side of the backrest, and is mounted in a common plane with the longitudinal guide of the height adjustment mechanism. In this configuration, the headrest may be moved back and forth relative to the backrest. Also, the additional option exists of pivoting the headrest forward and backward for the purpose of tilt adjustment, specifically as a result of the course of the pivot shaft diagonally and along the upper side of the backrest. The potential headrest adjustments of this configuration are accordingly restricted. The known solutions are also complicated in design.

SUMMARY OF THE INVENTION

An object of the present invention is to provide an improved headrest in which the overall design cost will be lowered, while the height and tilt adjustment options will be increased.

This object is attained by headrest where the height adjustment mechanism is mounted between the pivot shaft for tilt adjustment of the headrest and the side of the headrest facing away from the seat occupant. This backrest structure can be greatly simplified in design, since no reinforcing structures or guide rails are needed on its frame for seating a headrest. The options for height and tilt adjustment of the headrest relative to the backrest are greatly increased. The headrest with its lower side may be pulled out as far as the pivot mechanism for adjustment of tilt. As a result, no parts of the headrest collide with the backrest. This situation avoids corresponding restriction of options in conventional arrangements. The present invention optimizes the range of adjustment of the tilt of the headrest so that the tilt may be adjusted to the extent of extreme tilt angles.

In a preferred embodiment of the headrest of the present invention, the height adjustment mechanism has a catch positioning mechanism. In this way, the headrest may be adjusted repeatedly and simply to specific assigned or assignable height positions. In one especially preferred embodiment, the catch positioning mechanism has in the longitudinal guide a spacing component with recesses into which a prestressed catch component of the guide component may be engaged. The at least partial integration of the catch positioning mechanism with the longitudinal guide results in an especially compact and accordingly space-saving configuration of the height adjustment mechanism.

In another preferred embodiment of the headrest of the present invention, the height adjustment mechanism has at least one energy accumulator component. Particularly, the energy accumulator can be in the form of a tension spring extending along the respective longitudinal guide and articulated with a point of application on the guide component and with another point of application in the area of the lower side of the headrest. The energy accumulator component supports the movement of adjustment in the direction opposite the direction of gravity (upward) during height adjustment of the headrest. In one particular cost-effective embodiment, the energy accumulator component is in the form of at least one tension spring. Extension along the longitudinal guide results in optimal transfer of force from the energy accumulator component to the headrest, along with avoidance of the presence of a cantilever on the guide component. The cantilever may result in jamming of the guide component in the longitudinal guide, and accordingly, cause poor controllability of the height adjustment mechanism.

In a further preferred embodiment, the guide component has a recess for the energy accumulator component such that the energy accumulator component is integrated with the guide component when the headrest is in the fully extended position. Optimal utilization of the adjustment path for the height adjustment is thereby ensured.

In one especially preferred embodiment of the headrest of the present invention, a receiving component detachably connected to the headrest serves as the area of contact of the energy accumulator component in the area of the lower side of the headrest. The energy accumulator component or the height adjustment mechanism is thus accessible at low cost for maintenance or cleaning.

In another preferred embodiment, the headrest is provided with two side components which may be mounted in assignable angular positions relative to a base component and by way of a locating mechanism, a catch mechanism in particular. The other potential adaptations of the headrest provided by the side components represent a considerable gain in comfort for the seat occupant. The adjustment of the side components to assignable angular positions simplifies operation in the adjustment process. A catch mechanism permits retention of a selected adjustment once it has been made, so that no undesirable displacement of the side components takes place.

In another advantageous embodiment of the headrest, the pivot shaft is in the form of a friction coupling on the guide component. A fastening position for the headrest is connected to the guide component by the friction coupling on the backrest. The friction coupling permits continuous adjustment of the tilt of the headrest. Since that friction coupling connects the guide component to a fastening position for the headrest on the backrest, a very compact structure is provided. Only slight leverage is applied to the individual components. The mechanical stability under load of the height and tilt adjustment mechanism is as a result very high. In the event of application of a heavy load, such as impact of a head, the forces introduced can be reliably absorbed and without great discomfort to the head.

In one especially preferred embodiment, the base component and the two side components are in the form of laminar molded elements. This structure permits cost-effective production of these components. Reduction in weight with no significant loss of stability may be achieved by means of suitably selected recesses in the laminar components.

In another preferred embodiment of the headrest, the base component has a central recess. The height and tilt adjustment mechanisms extend on both sides next to the central recess along the base component facing the two side components. In addition to the weight reduction, the central recess provides, in particular, improved impact protection for the rear of the head of the seat occupant in the event of an accident. There are no hard or sharp-edged structures of any nature under the headrest padding which might lead to a head injury. The height and tilt adjustment mechanism is accordingly mounted on both sides next to the central recess along the base component facing the two side components.

One especially preferred embodiment of the headrest is characterized in that a lighting fixture is mounted in the padding of at least one of the two side components. Significant increase in comfort is provided by the associated options for individual adaptation to the needs of a seat occupant.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1A:
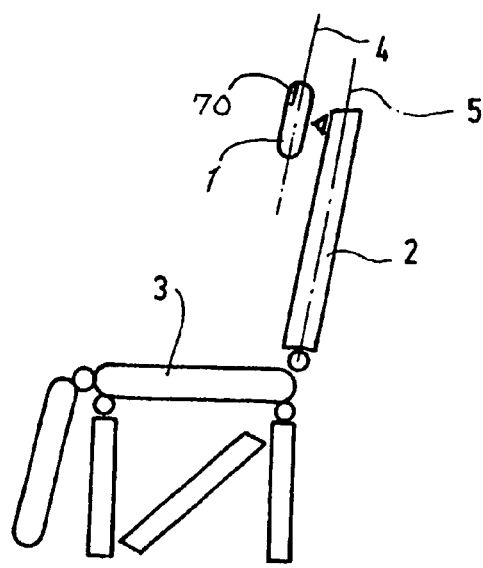
FIGS. 1a to 1g are graphical, side elevational views of a seat with a headrest according to an embodiment of the present invention in different tilt and height adjustment positions relative to the backrest of a seat.
Figure 1B:
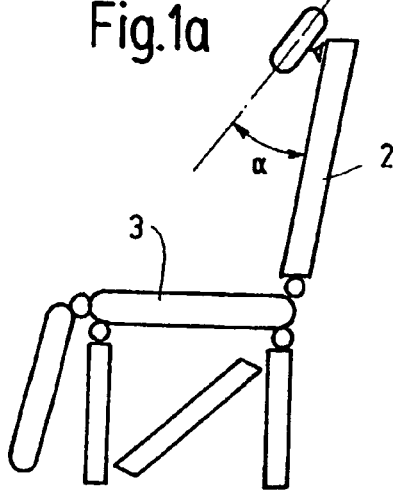
Figure 1C:
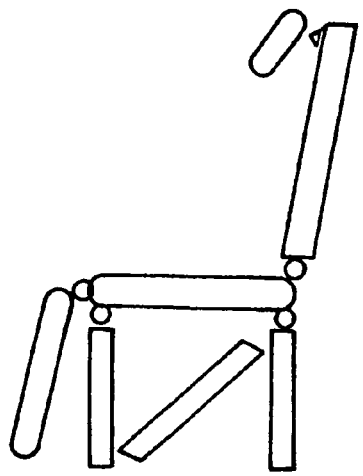
Figure 1D:
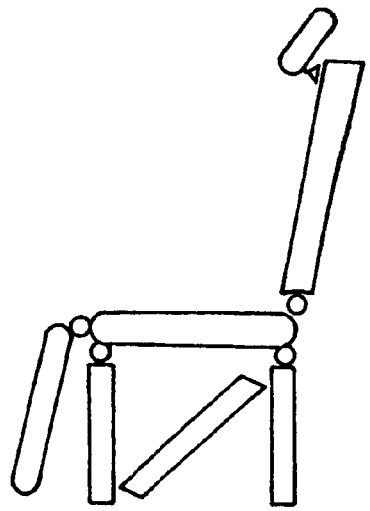
Figure 1E:
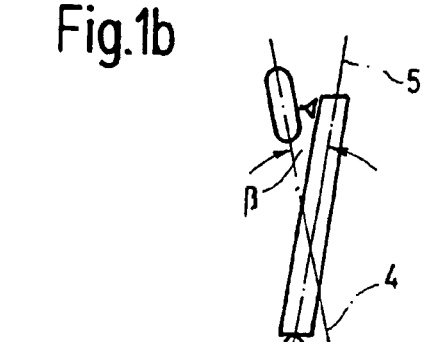
Figure 1F:
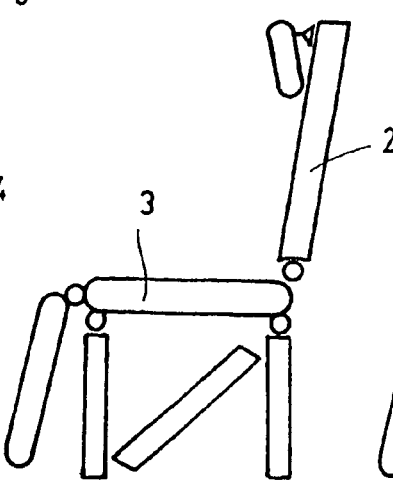
Figure 1G:
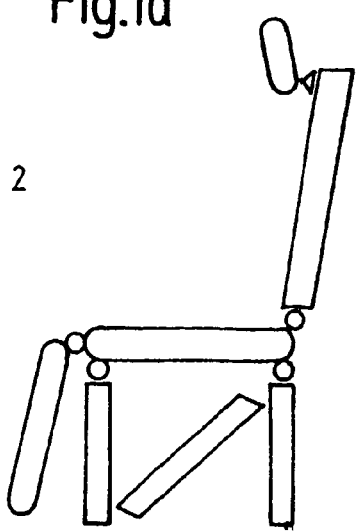

FIGS. 1a to 1g show an embodiment of a headrest according to the present invention in different tilt and height adjustments or positions relative to a backrest 2 of a seat 3. In FIG. 1a the headrest 1 is presented in a base position such that it assumes an intermediate height. The longitudinal axis 4 of the headrest is oriented parallel with the longitudinal axis 5 of the backrest. In FIGS. 1b to 1d, the headrest 1 assumes a positive angle of inclination $\alpha$. In FIGS. 1e to 1g, a negative angle of inclination $\beta$. These figures clearly illustrate the multiplicity of different potential adjustments.

Figure 2:
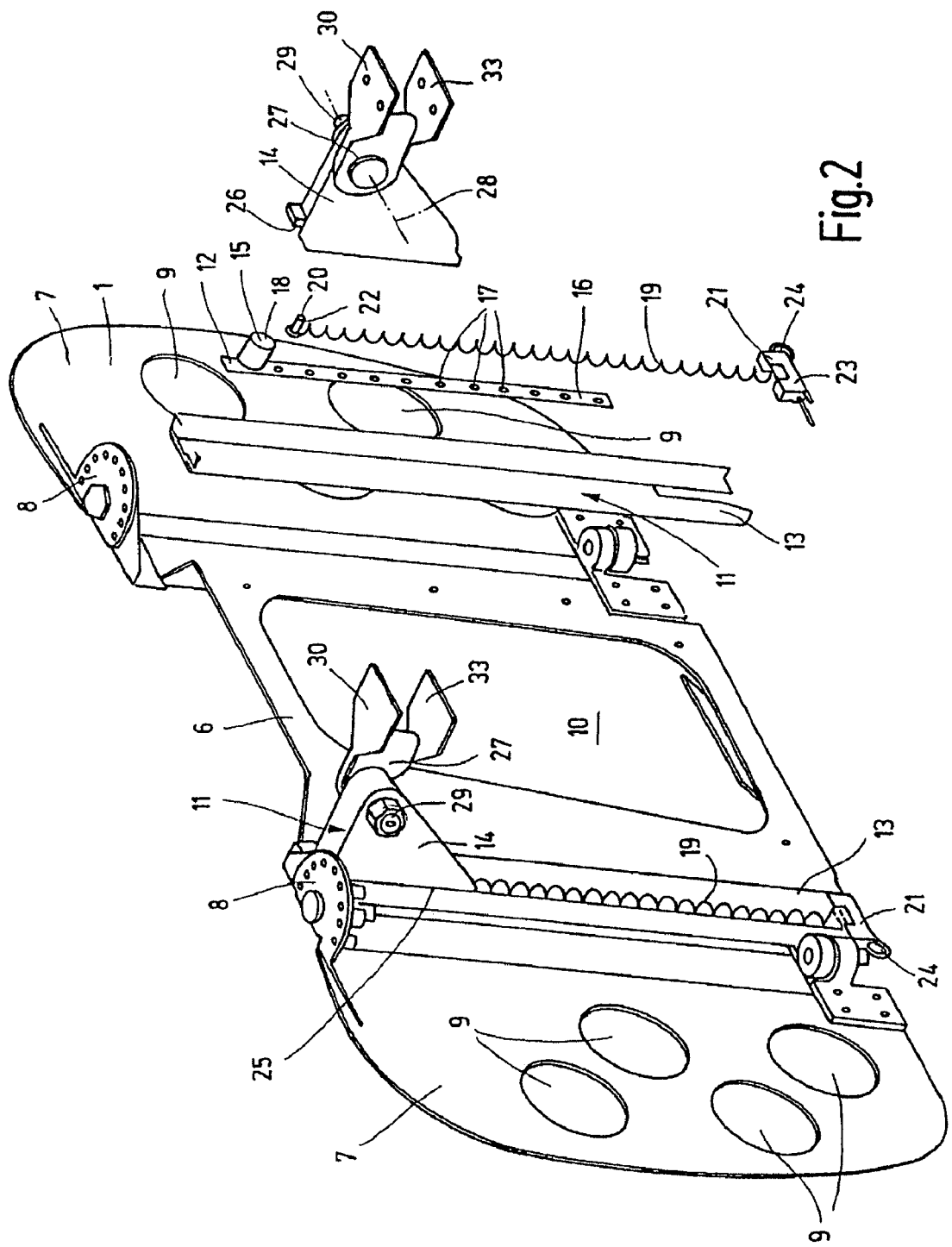
FIG. 2 is a partially exploded, perspective view of the headrest of FIG. 1 without padding and cover material in an overall view diagonally from the rear side.

FIG. 2 shows the headrest 1 without padding and cover material in an overall partly exploded view obliquely from the rear. The headrest 1 has a base component 6 on which two side components 7 are hingedly mounted. The rotating or pivoting motion of the side components 7 relative to the base component 6 may be stopped in the position desired by the seat occupant by a locking mechanism 8. The locking mechanism 8 may, for this purpose, be designed as a catch mechanism in which a mechanically prestressed catch (one mounted on an armature component of the base component 6) is engaged in assignable recesses or cavities in a guide bar. This arrangement makes it possible to place the side components 7 in assignable angular positions relative to the base component 6. The locking mechanism 8 may also be configured so that the side components 7 may be adjusted to any desired angular position relative to the base component 6. With this solution, the side components 7 may be kept in a desired position exclusively by the static friction occurring in the locking mechanism 8 or additionally by the stopping action of a locking mechanism (not shown).

The base component 6 and the side components 7 are laminar molded components in the configuration shown in FIG. 2. They may formed of a plastic or a metal, in particular a light metal such as aluminum. The molded components have openings 9, which among other things reduce weight. The base component 6 has an opening in the form of a central recess 10. On each side of central recess 10, a height and tilt adjustment mechanism (designated as a whole as 11) is mounted in the direction of the side components 7. The area of the central recess 10 in the base component 6 is kept entirely clear of hard or sharp-edged structures which could cause injuries in the event of a hard impact of the occupant's head on the headrest. A tubular frame design or a combination of these alternatives is also possible in place of a laminar configuration of the base component 6 and the side components 7.

The height adjustment mechanism 12 has a longitudinal guide 13, a guide component 14 and a catch positioning mechanism 15. The longitudinal guide 13 extends in parallel with the longitudinal axis 4 of the head rest on both sides of the central recess 10 of the base component 6. The longitudinal guide 13 has a clamp-shaped profile in cross-section, such as a double C profile, so that the guide component 14 is securely retained. The catch positioning mechanism 15, which in the configuration shown in FIG. 2 has a spacing component 16 with recesses 17 in which a prestressed catch component 18 of the guide component 14 may be engaged, is integrated with the longitudinal guide 13. The spacing component 16 may be a strip of metal or plastic in which the recesses 17 in the form of through borings or cavities are positioned. The prestressed catch component 18 may be cost-effectively and reliably configured as a catch with spring-loaded ball. However, application of mechanical prestressing to the catch may also be effected by hydraulic, pneumatic, or magnetic means. The height adjustment mechanism 12 may have as another component an energy accumulator component 19 which supports the height adjustment process in movement of the headrest upward.

The energy accumulator component 19 extends along the respective longitudinal guide 13 and is coupled with a point of application 20 on the guide component 14 and with another point of application 21 in the area of the lower side of the headrest.

In the embodiment shown in FIG. 2, the point of application 20 on the guide component 14 is in the form of a connecting component 22. Connecting component 22 may be omitted in another embodiment, where the energy accumulator component 19 engages the guide component 14 directly. The point of application 21 in the area of the lower side of the headrest 1 is in the form of a seating component 23 detachably connected to the headrest 1. For the purpose of connecting the seating component 23 to the headrest 1, to the longitudinal guide 13 in particular, the seating component 23 may have securing means 24. In the exemplary embodiment shown in FIG. 2, the securing means is a splint, but may otherwise also be in the form of a screw or a dowel pin.

The energy accumulator component 19 in the embodiment shown in FIG. 2 is in the form of a helical spring. This represents a very cost-effective and very easy solution. In other configurations the energy accumulator component 19 may also embodied as a hydraulic or pneumatic pressure accumulator component. The longitudinal guide 13 and the guide component 14 are configured so that the longitudinal guide encloses the guide component at least in part or conversely. Movement of the two components relative to each other may occur in the main only in the direction determined by the longitudinal axis of the guide 13.

When the headrest 1 is positioned at a minimal height relative to the backrest 2, as is illustrated on the left side in FIG. 2, the guide component 14 is positioned at the upper end 25 and the energy accumulator component 19 is prestressed from its neutral or rest position so that the energy accumulator component 19 actively supports or biases movement upward during height adjustment of the headrest 1.

When the headrest 1 is in the position of maximum height adjustment relative to the backrest 2, the seating component 23 is near the lower side facing it of the guide component 14 or rests at least in part on it. In the latter case, the guide component 14 may simultaneously assume the function of a catch on the upper end of the displacement path of the height adjustment mechanism 12. However, a catch may also be configured as a hydraulic or pneumatic embodiment of the energy accumulator component 19.

The surfaces of the longitudinal guide 13 and the guide component 14 facing each other have on at least one of these components a groove-like recess 26 which extends parallel to the longitudinal direction of the longitudinal guide 13. The energy accumulator component 19 mounted in parallel with this guide is seated at least in part in the groove-like recess 26. In the position of maximum height adjustment of the headrest 1 relative to the backrest 2, energy component 19 is seated entirely or at least substantially between the longitudinal guide 13 and the guide component 14. In a preferred configuration, the guide component 14 has the groove-like recess 26 designed so that the energy accumulator component is seated in its entirety in the guide component 14 when the headrest 1 is in the fully extended position.

The longitudinal guides 13 are mounted on both sides of the central recess 10 of the base component 6 on the rear side of the headrest facing away from a seat occupant on the front side and are an integral components of the headrest 1. As a result, the tilt adjustment mechanism 27 is mounted to be stationary relative to the backrest 2 or variable in height relative to the headrest 1, so that the options for adjustment of the tilt of the headrest 1 relative to the backrest 2 are greatly increased. Optimal configuration of these relationships is achieved if the height adjustment mechanism 12 is mounted between the rear side of the headrest 1 facing away from the seat occupant and a pivot shaft axis 28 for adjustment of the tilt of the headrest 1.

In the embodiment shown in FIG. 2 the pivot shaft or axis 28 formed of a friction coupling 29 on the guide component 14. Continuous adjustment of the tilt of the headrest 1 is made possible by this friction coupling. The guide component 14 is connected by friction coupling 29 to a fastening point 30 on the backrest 2. A motor-driven mechanism rather than the friction coupling 29 may also assume the function of connecting headrest to backrest and of locking the headrest 1 in the position desired. Especially preferred is use of a so-called hydrolock which permits continuous height adjustment. In that case, application of force by the seat occupant is required only for adjustment of the movement of the headrest 1 downward. The hydrolock performs the work required for the purpose in upward adjustment of the headrest.

Figure 3:
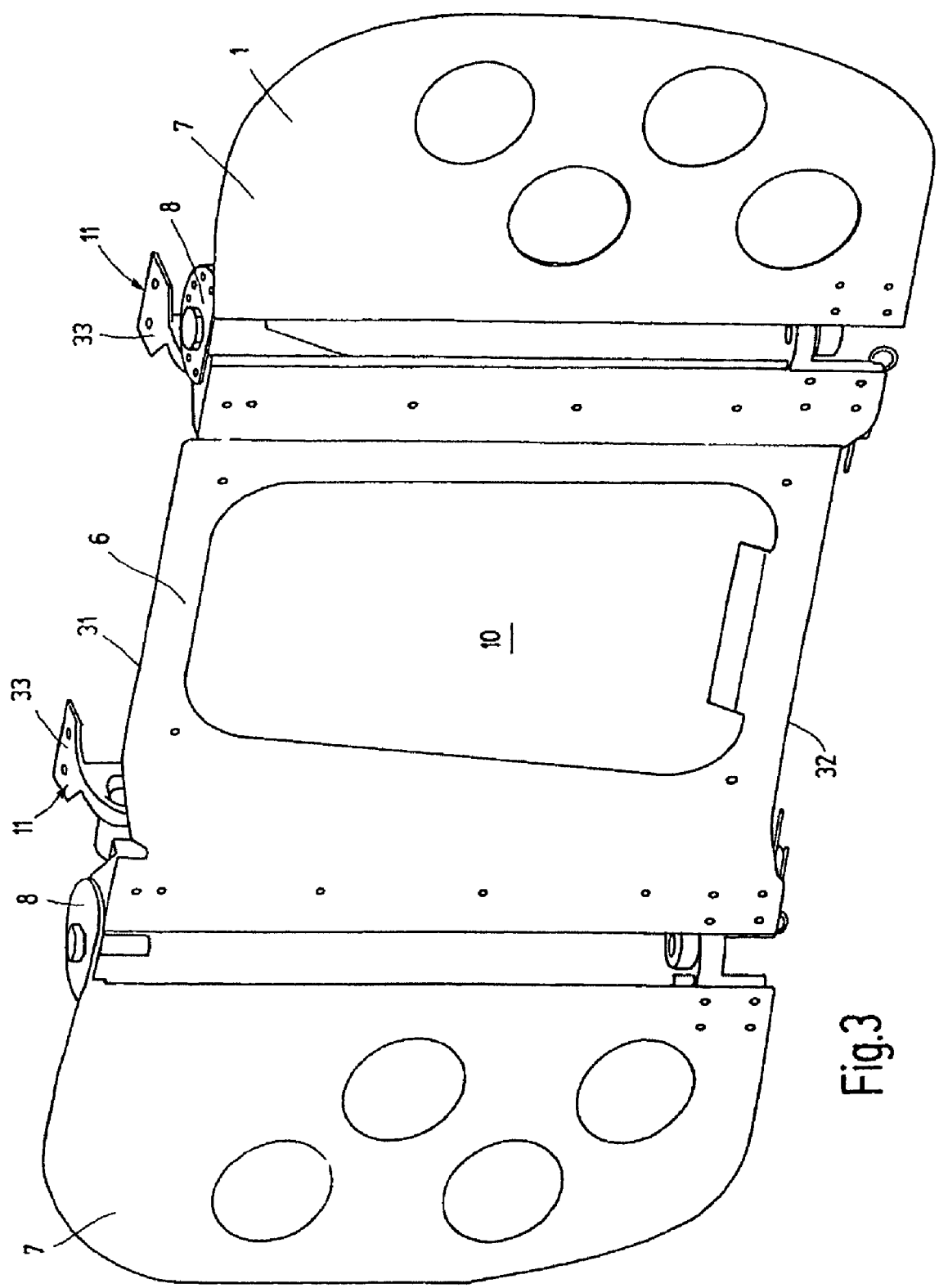
FIG. 3 is a perspective view of the headrest of FIG. 1 without padding and cover material in an overall view diagonally from the front side.

FIG. 3 shows the headrest 1 without padding and covering in an overall view diagonally from the front side. The entire front side of the headrest facing or adjacent to the seat occupant is very smooth and even, since all components of the height and tilt adjustment mechanism 11 are mounted on the side of the headrest 1 facing away or remote from the seat occupant. The central recess 10 in the base component 6 is kept completely free of components of any kind. As a result of this structure, injuries are prevented in this area in the event of impact on the head. The upper edge 31 of the base component 6 extends somewhat to the rear relative to a seat occupant, so that it is somewhat farther away from a seat occupant than the lower edge 32 of the base component 6. Consequently, the base component 6 already has an ergonomically preshaped outline, so that less padding material need be expended overall for ergonomic configuration of the headrest 1.

As the foregoing exposition makes clear, the tilt pivots are positioned to the front of the guide components, so that different tilt angles are obtained. Since the longitudinal guides for them are integrated into the headrest, the headrest may be secured on the backrest 2 by way of retaining clips 33 associated with the respective headrest. Since the backrest 2 consequently has no longitudinal guide of its own, there are no slots to be seen in the backrest padding. This lack of backrest slots improves seating comfort, since no otherwise customary slot guide is to be detected in the backrest even when the headrest is raised completely to its highest position.

The headrest may also be rapidly replaced by way of the retaining clips 33. The clips may be secured on the tilt adjustment mechanism by the friction coupling 29. Another replacement possibility is represented by removal, after detaching the securing means 24 in the shape of a securing bolt, of the headrest with its longitudinal guides 13 from the backrest 2. The height and tilt adjustment mechanism 11 then remains stationary on the backrest 2. In one embodiment (not shown), the height adjustment mechanism 12 may be in the form of the respective longitudinal guide 13 itself. In that case, the recesses 17 are integrated directly into the longitudinal guide. As a result of employment of the spacing component 16 as an independent component, the spacing component may nevertheless be designed to be rugged for engagement of the detent sphere. For example, it may consist of a steel material which is subject to low wear. Otherwise the longitudinal guide 13 may made directly of a light plastic material.

A lighting component 70 can be mounted in the padding of one of the side components.

While one embodiment has been chosen to illustrate the invention, it will be understood by those skilled in the art that various changes and modifications can be made therein without departing from the scope of the invention as defined in the appended claims.

What is claimed is:

1. A seat comprising
   a backrest;
   a headrest adjustable in height and tilt relative to said backrest, said headrest having a front surface facing an occupant of the seat and a rear surface facing away from the occupant;
   a pivot axis for tilt adjustment of said headrest mounted on a guide component mounted on said rear surface and extending away from said front surface, said guide component and said pivot axis being stationarily mounted to said backrest; and
   a longitudinal guide mounted on said rear surface and displaceably engageable with said guide component for height adjustment, said longitudinal guide being an integral component of said headrest, said longitudinal guide and said guide component being mounted between said pivot axis and said rear surface.

2. A seat according to claim 1 wherein
   a catch positioning mechanism releasably couples said longitudinal guide and said guide component.

3. A seat according to claim 2 wherein
   said catch positioning mechanism comprises a spacing component located in said longitudinal guide, said spacing component having recesses; and
   a prestressed-catch component of said guide component being releasably engageable in said recesses.

4. A seat according to claim 1 wherein
   at least one energy accumulator extends along said longitudinal guide and is coupled at a first point thereof to said guide component and at a second point thereof to a lower side of said headrest.

5. A seat according to claim 4 wherein
   said energy accumulator is a tension spring.

6. A seat according to claim 4 wherein
   a seating component is detachably connected to said headrest and coupled to said energy component at said second point thereof.

7. A seat according to claim 4 wherein
   said guide component comprises a recess receiving said energy accumulator, with said energy accumulator being integrated with said guide component in a fully extended position of said headrest.

8. A seat according to claim 1 wherein
   said headrest comprises a base component and two side components mounted to said base component for movement between angular positions relative thereto; and
   locking mechanisms on said base component and said side components secure said side components in selected angular positions.

9. A seat according to claim 8 wherein
   said base component and said side components comprise laminar molder parts.

10. A seat according to claim 9 wherein
    said base component comprises a central recess with height and tilt adjustment mechanisms on both sides of and adjacent to said central recess along said base component and facing said side components.

11. A seat according to claim 8 wherein
    said base and side components have exterior padding.

12. A seat according to claim 11 wherein
    said padding on one of said side components has a light fixture seated therein.

13. A seat according to claim 8 wherein
    said locking mechanism is a catch mechanism.

14. A seat according to claim 1 wherein
    said pivot axis comprises a friction coupling mounted on said guide component and fastening said headrest to said guide component.

* * * * *